June 12, 1956 M. H. R. COGAN 2,750,174
GRID TRAY CONTACT COLUMN
Filed Feb. 2, 1953 4 Sheets-Sheet 1

INVENTOR:
MYLES H.R. COGAN
BY: Oswald H. Milmore
HIS ATTORNEY

June 12, 1956     M. H. R. COGAN     2,750,174

GRID TRAY CONTACT COLUMN

Filed Feb. 2, 1953     4 Sheets-Sheet 2

INVENTOR:
MYLES H. R. COGAN
BY: Oswald H. Milmore
HIS ATTORNEY

June 12, 1956  M. H. R. COGAN  2,750,174
GRID TRAY CONTACT COLUMN
Filed Feb. 2, 1953  4 Sheets-Sheet 3

INVENTOR:
MYLES H. R. COGAN
BY *Oswald H. Milmore*
HIS ATTORNEY

June 12, 1956 M. H. R. COGAN 2,750,174
GRID TRAY CONTACT COLUMN
Filed Feb. 2, 1953 4 Sheets-Sheet 4

INVENTOR:
MYLES H. R. COGAN
BY: Oswald H. Wilmore
HIS ATTORNEY

United States Patent Office 2,750,174
Patented June 12, 1956

2,750,174

GRID TRAY CONTACT COLUMN

Myles H. R. Cogan, Houston, Tex., assignor to Shell Development Company, Emeryville, Calif., a corporation of Delaware Application February 2, 1953, Serial No. 334,520

11 Claims. (Cl. 261—113)

This invention relates to contact columns having contact trays, such as grid trays, built up of grid bars that are spaced apart to afford openings, such as slots, for the passage of fluent materials, but may be applied to other types of trays. Such contacting trays find particular application for fractionating columns wherein descending liquid and ascending gas (which term is used herein to include vapor) flow in countercurrent through the openings but may be employed also for other purposes, such as the scrubbing of air, smoke and other gases with liquids or in processes wherein the fluent material is a finely divided solid such as sand or a catalyst suspended in a gas, or for countercurrent liquid-liquid contacting.

In installations wherein the fluent material is corrosive or erosive it becomes impracticable to employ the usual arrangements for constructing the trays or mounting the trays within the column. The instant invention is concerned particularly with an improved construction and mounting of the trays within the column that is better suited to such operating conditions. The invention is further concerned with a contact column that has a smooth inner surface, which may be a surface of the column wall or a lining, e. g., one made of lead, tantalum or a noble metal, and with a mounting arrangement suitable for installing grid trays within such a column.

Further, the invention provides an improved contact tray assembly whereby the tray elements, such as discrete grid bars, can be readily clamped together to form composite trays that can be easily installed in and removed from vertical columns or towers. By this construction it becomes possible to use materials of construction that are difficult to cast or to form into larger units of areas sufficient to cover the full tray area or that would be unsuitable for use in large trays because of the danger of failure caused by thermal expansion and contraction.

In summary, according to the instant invention, the enclosing wall that defines the contacting tank or column contains a vertical series of contact assemblies, each assembly including a contact tray, a supporting tray rim, e. g., a pair of annular structures that clamp the tray or tray elements such as the grid bars in position, and a plurality of supporting or spacer posts secured to the tray rim for supporting each tray in vertically spaced relation to a lower tray, whereby only the lowermost contact tray assembly of the vertical series is supported by the column. The invention finds particular although not exclusive application in installations wherein the tray is built up of discrete grid bars that are supported and secured by the annular structures that constitute the tray rim, such bars being provided with suitable spacers to provide openings between bars, e. g., in the form of slots. The series of assemblies is retained by a hold-down member, such as a ring or truss member, which engages the uppermost assembly and is itself secured in position by a part of the column.

The invention will be further described with reference to the accompanying drawing forming a part of this specification and illustrating one preferred embodiment of the invention, wherein.

Figure 1:
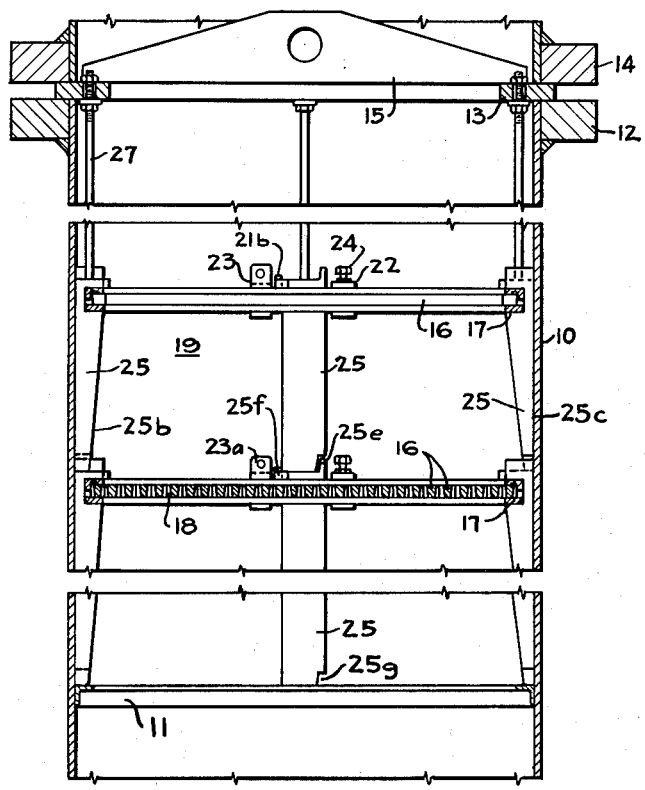
Figure 1 is a vertical section view through a portion of a column constructed in accordance with the invention.
Figure 3:
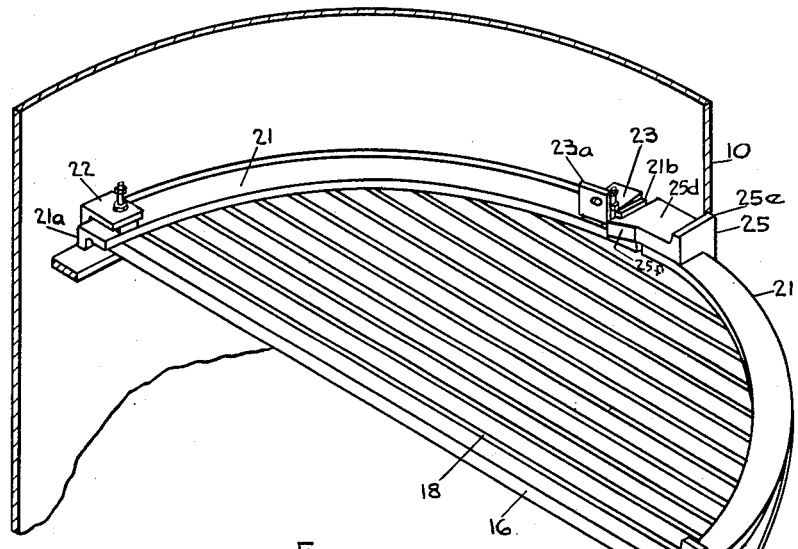
Figure 3 is a perspective view of a portion of the interior of the column showing the construction, certain parts being omitted for clarity.

Referring to the drawings in detail, the contacting column of Figures 1 and 3 comprises an outer, cylindrical upright shell 10, the wall of which is interiorly smooth and that may have suitable openings for the admission and discharge of the fluent materials to be passed through the column. Since the invention is not concerned with the particular arrangements for the control and passage of such fluent materials no further description thereof is made herein. The column has a support 11, such as an abutment ring welded to the wall at a lower part thereof. The upper part may have a flange 12 on which rests a hold-down ring 13 that is held in position by a flange 14 of the upper, separate part of the column, e. g., the dome. A beam 15 may be fixed to the hold-down ring to facilitate removal.

The contact tray proper may consist of a plurality of discrete tray elements, such as grid bars 16 that are laid side-by-side, in parallel relation on a support ring 17 (Fig. 7) which constitutes the lower annular clamp structure. These bars may be made of suitable corrosion-resistant or erosion-resistant material, depending upon the service to which the column is to be placed; thus, they may be made of cast metal, ceramic, or carbon. Each bar has a plurality of lateral enlargements 16a, 16b, on at least one side thereof and, if desired, on both sides as shown in the drawing, forming spacers. It may be noted that while two enlargements, situated at the ends of the bars are shown, the number may be varied. Thus, in large-diameter columns a greater number may be useful while two are satisfactory in small-diameter columns, when permitted by the rigidity of the bars. The spacers of each bar are in engagement with the adjacent bar, leaving intervening openings 18 for the passage of the fluent materials. In the preferred embodiment illustrated these openings are in the form of slots, and the widths of such slots are uniform throughout any one tray. Further, it should be noted that in this embodiment the trays extend over the full cross sectional area of the column, whereby the said slots form the only openings for the upward flow of gas and the downward flow of liquid through the tray.

Figures 4, 5, 6:
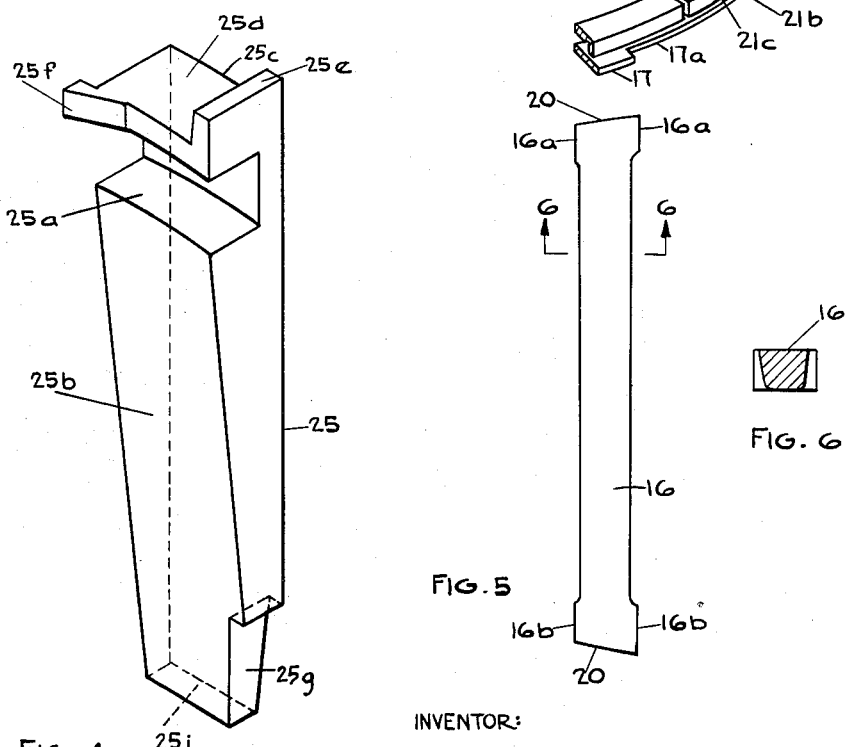
Figure 4 is a perspective view of a supporting spacer post.
Figure 5 is a plan view of one of the grid bars.
Figure 6 is a cross section view of the grid bar taken on line 6—6 of Figure 5.
Figure 7:
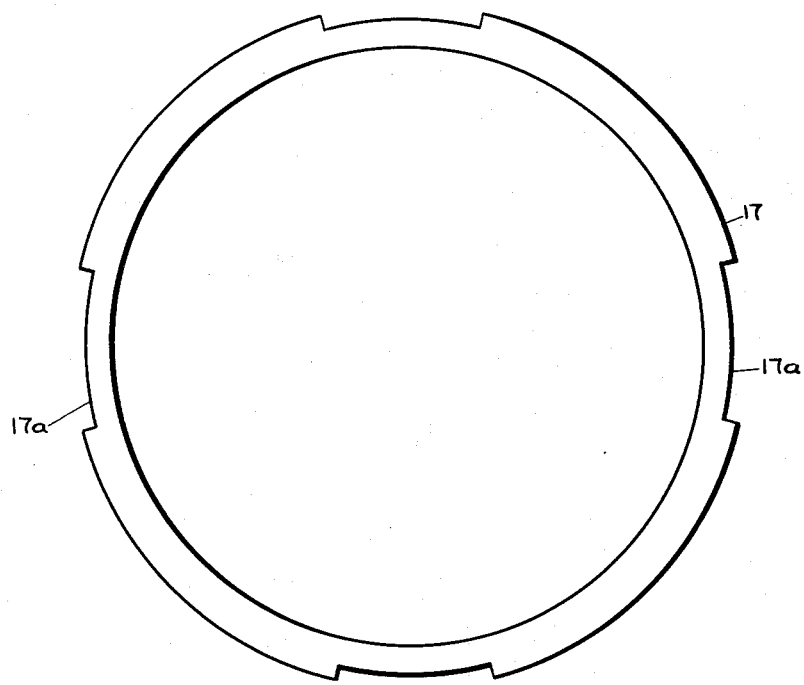
Figure 7 is a plan view of the lower clamp ring.

This invention is not concerned with the specific shapes of the grid bars and it is evident that other shapes and arrangements for spacing the bars may be used. For example, the spacer blocks may be separate from the bars and the lower ring 17 may have an upstanding flange at the radially inner edge, as shown in Figures 6 and 7 of my copending application Serial No. 326,330, filed December 16, 1952, now Patent No. 2,711,308 of June 21, 1955, for retaining the separate spacer blocks.

The cross sectional shapes of the grid bars intermediate the spacers determine the shape of the slot. The instant invention is not concerned with any specific shape for such bars and slots, and the trapezoidal shape of the bar shown in Figure 6, resulting in a slot that converges to the top, although preferred in many cases, is merely illustrative. Without restricting the scope of the invention, it may be stated that grid bars of the type illustrated, when used for distillation columns, are usually spaced apart to provide between them slots 16 that are between about 0.05 and 1.0 inch in width, spacings between 0.1 and 0.6 inch being usually most suitable, and the bar widths are selected in relation to the slot widths so that the aggregate of the slot areas through the tray (measured at the narrowest parts of the slots and herein referred to as the free area) is from 7 to 40% of the total area of the grid, free areas of from about 10 to 20% being most commonly used. Such trays are spaced apart vertically to provide intervening spray contact spaces 19 for the upward flow of atomized liquid to provide intimate contact between liquid and gas. These spaces are, for best results, made high enough to permit disengagement of the liquid droplets, so that the gas can ascend through the next higher tray without carrying over any appreciable quantity of liquid. Too close a vertical tray spacing limits the permissible gas flow rate and also the load point, i. e., the rate of gas flow at which liquid is prevented from descending through the slots in sufficient amount to maintain the necessary flow of liquid and at which the column therefore becomes inoperative due to flooding. In general, it is desirable in distillation columns to space such trays apart by distances at least about three times the bar widths, and spacings from three to thirty inches are typical. The trays may be oriented as desired, e. g., as shown in Figure 1, with the bars of each tray at right angles to those of the adjacent trays.

Figure 8:
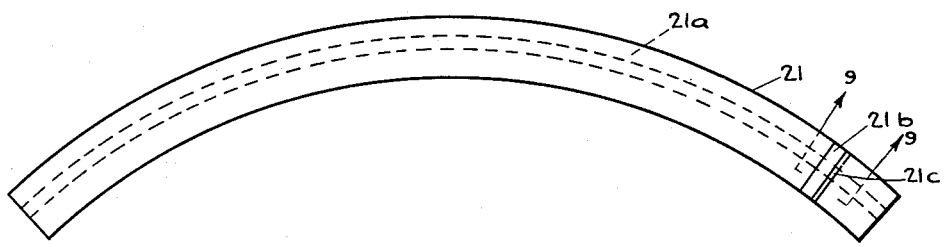
Figure 8 is an enlarged plan view of one of the sectors forming the upper annular clamp structure.
Figure 9:
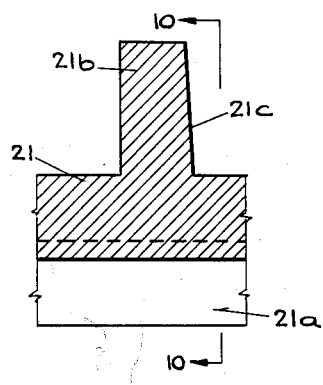
Figure 9 is a fragmentary longitudinal section view taken on line 9—9 of Figure 8.
Figure 10:
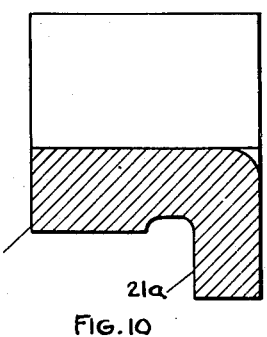
Figure 10 is a cross sectional view of the sector, taken on line 10—10 of Figure 9.
Figure 11:
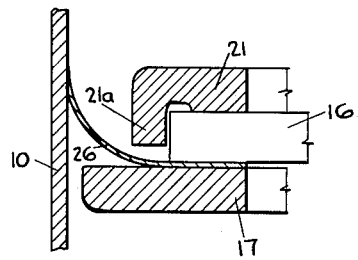
Figure 11 is a fragmentary cross sectional view of the contact tray assembly mounted within a column.

As was indicated above, the grid bars are discrete, being made of separate pieces and simply laid on the clamp ring 17 in close juxtaposition. The lengths of the bars are graduated to conform to the interior diameter of the column and the ends may be rounded as indicated at 20 (Figure 5) to conform to the lip 21a of an upper annular clamp structure 21, leaving only a slight clearance for expansion (Figure 11). The upper clamp structure 21 is formed of a plurality, e. g., four ring segments (Figures 8–10), and has an outer diameter somewhat less than that of the lower clamp ring 17. The outer dependent flanges 21a of these segments extend downwardly over the ends of the grid bars and these segments clamp down these bars by contact with the upper faces thereof. The upper clamp ring segments 21 are retained in position securely by suitable clamp means, each segment preferably having two clamps, indicated at 22 and 23. These clamps are U-shaped, slipped about the upper and lower annular clamp structures from the radially outer side and secured by screws and lock nuts 24. The clamps 23 have perforated flanges 23a extending upwardly for engagement by a hook or other hoisting means. The lower clamp structure is peripherally notched as indicated at 17a to a diameter equal to that of the upper clamp structure at the parts where the clamps are applied, the notch extending circumferentially for a distance sufficient to accommodate two clamps that hold different ring segments 21 and, in addition, a vertical supporting post or spacer 25, described below (Figure 7). The lips or dependent flanges 21a on the upper ring segments prevent radial displacement between the grid bars and clamp structures, such as would be caused by thermal expansion and contraction.

It will be noted that grid bars are symmetrical about the center line of the tray parallel with the bars; therefore, it is necessary only to duplicate the bars of half of the tray to complete any number of grid trays. Contact trays of this type need not be sealed completely to the wall of the column provided, of course, that any gaps remaining be smaller than the widths of the slots 18 between the grid bars. To close the annular space substantially completely an annular piece of flexible sealing material 26 is clamped between the grid bars and one of the annular clamp structures, e. g., the lower ring 17 (Figure 11). The annulus of sealing material is advantageously provided in segments corresponding to the lengths of the unnotched parts of the lower clamp ring; it extends radially upwardly and outwardly from the clamp structures and has a sliding engagement with the wall of the column 10, against which it bears flexibly in sealing relation. This sealing annulus may be made of any material having some flexibility and resistant to the substances to be contacted, e. g., metal or plastic such as that sold under the trademark "Teflon."

Each supporting post 25 (Figure 4) has a horizontal notch 25a cut into the radially inner face 25b thereof. This face and the radially outwardly directed face 25c opposite thereto may, if considered necessary, be curved concentrically with the column 10 so that the latter face will fit snugly against the wall, but this is not essential, particularly in large diameter columns. The notch 25a is positioned near the top of the post and has a height just sufficient to receive the assembled clamp structures, grid bars and annular seal. The upper end has the horizontal face 25d on which a similar post from a higher adjacent tray is adapted to rest in abutting relation. A flange 25e extends upwards from the horizontal face 25d and slopes upwardly in a circumferential direction toward one side of the post (the clockwise direction shown in the embodiment). A locking lug 25f is offset from the radially inward face 25b and extends circumferentially beyond the side of the post for locking one end of the upper clamping ring sector 21 in place, as will appear. The lower part of each post is reduced in cross sectional area and shape to cooperate with the upper face 25d and flange 25e of another post and the lug 21b on an adjacent lower contact tray assembly to receive support and to be positioned circumferentially thereby. To this purpose the post has a notch 25g situated directly beneath the flange 25e and having a complementary inclined vertical face; and at least the lower part of the radially inwardly directed face 25b is sloped radially outwardly throughout a part or all of the height thereof, as shown, whereby the bottom face 25i of the post has a considerably reduced cross sectional area. The faces 25d and 25i are preferably ground precisely for good contact and to make all of the several posts 25 of any one assembly to precisely the same length.

Each upper clamp ring sector 21 has an upstanding lug 21b spaced circumferentially from one end thereof by a distance less than the circumferential dimension of the post 25, this lug being positioned so as to extend along the side of the post opposite to the flange 25e when the end of the segment is inserted into the notch 25a. The face of the lug 21b that is directed toward the post slopes upwardly away from the latter as indicated at 21c.

Figure 2:
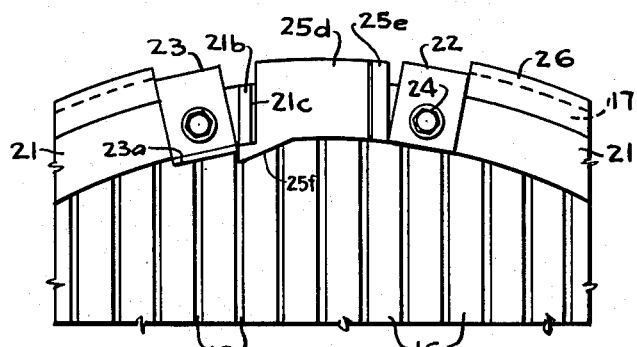
Figure 2 is an enlarged fragmentary plan view of the contact tray assembly.

To form one contact tray assembly the grid bars 16 are laid on a clamp ring 17 on which four sealing segments 26 have been placed and four upper clamp ring segments 21 are positioned above the bars with their depending lips 21a partly covering the ends of the bars. A clamp 23 is then attached to each ring segment adjacent the lug 21b thereof. A post 25 is then attached from the outside so that each junction between adjacent segments 21 (which are situated at the centers of the notches 17a, as indicated in Figures 2 and 3) is received within a notch 25a. The posts 25 are then shifted slightly in a counter-clockwise direction so as to bring the locking lugs 25f thereof into locking relation with the radially inner faces of the lugs 21b and concomitantly to bring the sides of the posts into abutment with the lugs 21b. A clamp 22 is then attached to each ring segment in engagement with the exposed side of the post so as to retain the latter against the lug 21b of the adjoining ring segment. The assembly is now complete and may be introduced into the column 10 by attaching suitable suspension means to the perforated flanges 23a.

Referring to Figure 1, it will be noted that the lowermost tray assembly has the posts 25 thereof resting on the abutment ring 11, and that each superior assembly has the posts thereof resting directly on the upper face of the next lower post. In this way all superior assemblies are positioned independently of the wall of the column 10 and the heights of the several trays are determined solely by the lengths of the posts. The flanges 25e and lugs 21b, together with the faces 25d form positioning recesses that cooperate with the posts resting thereon. When all assemblies have been emplaced, the ring 13 is clamped between the flanges 12 and 14 and vertical holddown rods 27 are adjusted to bear against the upper ends of the posts of the highest assembly.

The annular clamp structures, posts and clamps may all be made of suitable corrosion-resistant or erosion-resistant material, preferably metal. The grid bars may be made of the same or similar material but may also be made of ceramic or carbon or other materials that are difficult to cast or fabricate in large or complex shapes. By this construction it becomes possible to employ grid bars that are fabricated in short lengths and the difficulties experienced in casting corrosion-resistant trays in larger sections, due to unequal stresses which develop during the casting process, are avoided. Such a column as is shown herein is useful, for example, in the distillation of liquid containing sulfuric or other acid. A further advantage of this construction is that the contact tray assemblies are easily removed from the column and that, should the contingency arise, individual grid bars can be replaced in the tray assembly at minimum cost.

Figure 13:
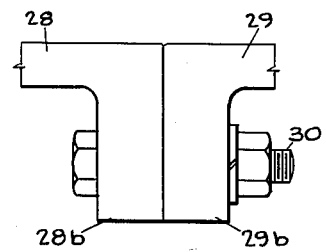
Figure 13 is a fragmentary, enlarged elevation view of the clamp structure according to Figure 12, taken on line 13—13 of that figure.
Figure 12:
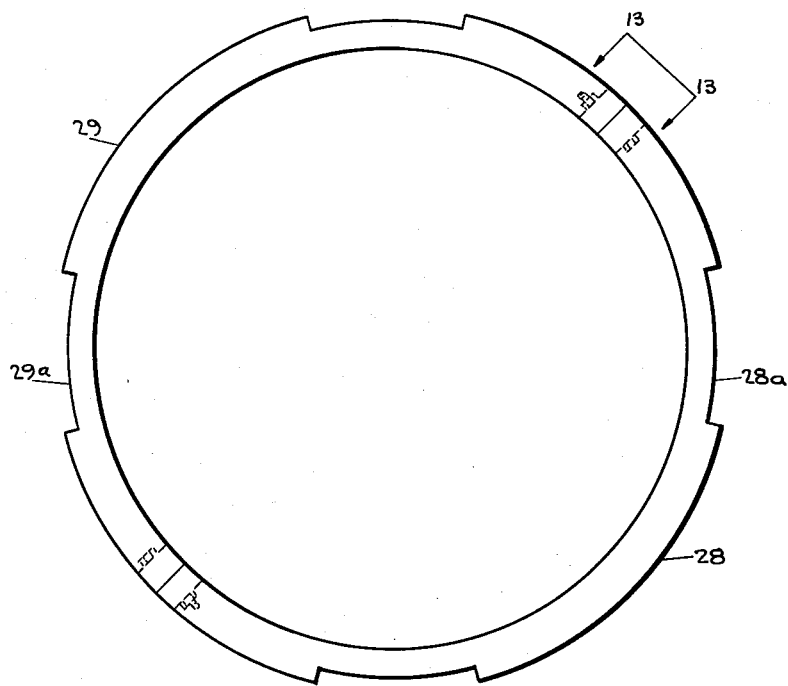
Figure 12 is a plan view of the lower annular clamp structure according to a modified construction.

It is evident that modifications may be made in the details of the elements of the tray assembly. For example, the lower clamp structure need not be continuous but may be made circumferentially continuously rigid and of two ring segments 28 and 29, as shown in Figures 12 and 13. These segments have notches 28a and 29a so as to have an outline in plan corresponding to that of Figure 7 and have flanges 28b and 29b which are fastened together by bolts 30.

I claim as my invention:

1. In a contact column, the combination of an enclosing upright wall defining a contact tank and a plurality of contact tray assemblies at different levels within the tank, each said assembly comprising: a contact tray having openings for the passage of substances to be contacted and being situated in vertically spaced relation to the trays of adjoining assemblies; a tray rim near said enclosing wall supportingly secured to the tray; and a plurality of supporting posts separate from said tray rims having horizontal notches on the sides thereof away from said enclosing wall at a level intermediate the ends of the posts, said tray rims being in part positioned within said notches for support thereby, said posts extending both upwards and downwards from the respective tray rim to which they are secured and having at the top and bottom thereof upwardly and downwardly directed surfaces, respectively, each said post except the post of the lowermost assembly having the downwardly directed surface thereof resting directly on the upwardly directed surface of the post of an adjoining lower tray assembly, whereby the vertical spacing of said assemblies is determined only by the lengths of said posts.

2. A construction according to claim 1 wherein said tray rim is notched at the edge thereof toward said enclosing wall at the parts of the rim opposite the posts thereof, the parts of the rim intermediate the said notches in the rim being situated in proximity to said enclosing wall.

3. A construction according to claim 1 wherein said tray rim comprises upper and lower clamping frame members situated respectively immediately above and below said contact tray and said contact tray assembly has clamp means securing the said frame members to the tray, at least some of said clamp means being positioned contiguous to the posts for positioning the posts along the rim.

4. A contact tray assembly adapted for use as one of a vertical series of like tray assemblies within a contact column comprising: a contact tray having openings for the passage of substances to be contacted; a pair of annular clamp structures disposed one above and another below said tray; a plurality of supporting posts distributed circumferentially about the tray, secured to said clamp structures and extending substantially vertically from beneath the lower clamp structure to above the upper clamp structure, each said part of the assembly being shaped to provide a ledge for supporting said clamp structure and having at one end a face for vertical abutting relation with another post of an adjacent assembly; clamp means for holding said annular clamp structures in clamping relation to the tray; and positioning means at one end of at least one post of the assembly shaped to cooperate with the end of another post of an adjacent assembly to retain the two posts in predetermined supporting relation, the other end of the said post of the assembly having a shape corresponding to that of the said end of the said other post.

5. A contact tray assembly according to claim 4 wherein said one end of the post of the assembly has a flange extending vertically away from said face at one circumferentially directed side of the post, and one of said annular clamp structures has a lug extending along the other circumferentially directed side of the post beyond the said face, whereby said flange and lug form projecting guide means for positioning the said other post in a circumferential direction.

6. A contact tray assembly according to claim 4 wherein said tray comprises a plurality of discrete grid bars extending across the annular clamp structures, adjacent grid bars having parts thereof spaced apart to define the said openings, said clamp structure securing the several grid bars in predetermined relation.

7. A contact tray assembly adapted for use as one of a vertical series of like tray assemblies within a contact column comprising: a contact tray having openings for the passage of substances to be contacted; a pair of annular clamp structures disposed one above and another below said tray; a plurality of supporting posts distributed circumferentially about the tray, secured to said clamp structures and extending vertically from beneath the lower clamp structure to above the upper clamp structure, said posts being shaped to provide ledges for supporting said clamp structures, one of said annular clamp structures being formed of a plurality of ring segments extending through arcs joining adjacent posts and said posts having lugs projecting circumferentially at the radially inner parts thereof for locking engagement with said ring segments; and clamp means for holding said annular clamp structures in clamping relation to the tray.

8. In a contact tray assembly having a contact tray, the subcombination of a pair of annular clamp structures disposed one above and the other below the tray; a vertical supporting post having a horizontal notch at one radially directed side thereof receiving both of said structures, one end of the post having a face for abutment with another post of a like assembly and having a flange extending substantially vertically beyond said face at a circumferentially directed side thereof, the other end of said post having a circumferential dimension substantially equal that of the said face; a lug on one of said clamp structures extending vertically along the other circumferentially directed side of the post beyond said face, whereby said flange and lug form projecting guide means for positioning said other post circumferentially and wherein said lug secures the post against circumferential movement toward the lug; a clamp holding said annular clamp structures in clamping engagement with the tray and in engagement with the first-mentioned circumferential side of the post for securing the post against circumferential movement toward the clamp; and means interlocking said post and at least one of said annular clamp structures for preventing radial movement of said one clamp structure out of said notch in the post.

9. The subcombination according to claim 8 wherein said notch is formed in the radially inner side of the post and one of said annular clamp structures is notched on the radially outer edge thereof at the parts thereof that are within the said notch in the post.

10. A contact tray assembly adapted for use as one of a vertical series of like tray assemblies within a contact column comprising: a contact tray comprising a plurality of discrete grid bars having parts thereof spaced apart to provide openings for the passage of substances to be contacted; a circumferentially continuously rigid lower clamp ring beneath said bars; an upper clamp ring above said bars, formed of a plurality of segments; a plurality of supporting posts situated one at each juncture of a pair of said segments, each post having a horizontal notch at the radially inner side thereof and a part of the continuous ring and the ends of a pair of said segments being within said notch, each said post having at the top thereof a supporting face adapted for abutment with the bottom of another post of a like assembly and having a flange at one circumferentially directed side thereof extending vertically above said face, the lower end of the post having a circumferential dimension substantially equal to that of said supporting face, each segment having an upstanding lug spaced from the end thereof by a distance less than the circumferential dimension of the post and extending upwardly to above the said supporting face along the other circumferentially directed side of the post, whereby said flange and lug form projecting guide means for positioning said other post circumferentially and whereby said lug secures the post against circumferential movement toward the lug; a first clamp for each segment holding one end of the respective segment and the lower clamp ring in clamping engagement with the grid bars and in engagement with the first-mentioned side of the post for securing the post against circumferential movement toward the clamp; a second clamp for each segment holding the other end of the respective segment and the lower clamp ring in clamping engagement with the grid bars; and a second lug on the post projecting circumferentially beyond the post at the radially inner side of one of the segments at the post and in engagement with said segment for securing the post against radially outward movement.

11. In combination with the assembly according to claim 10, an annular strip of flexible sealing material clamped between one of said rings and the grid bars and extending outwardly and upwardly from the rings for sealing engagement with the wall of the column.

References Cited in the file of this patent

UNITED STATES PATENTS

| | | |
|---|---|---|
| 1,770,658 | Kremser | July 15, 1930 |
| 2,201,949 | Wentworth | May 21, 1940 |
| 2,545,651 | Cummings | Mar. 20, 1951 |

FOREIGN PATENTS

| | | |
|---|---|---|
| 885,548 | France | May 31, 1943 |
| 618,029 | Great Britain | Feb. 15, 1949 |